US008537681B1

(12) United States Patent
Krishnan et al.

(10) Patent No.: US 8,537,681 B1
(45) Date of Patent: Sep. 17, 2013

(54) MIXED MODE L2 CROSS CONNECT AND L3 TERMINATION AT AN EDGE NETWORK DEVICE

(75) Inventors: Sudhir Krishnan, Acton, MA (US); Mathias Kokot, West Medford, MA (US); John Gibbons, Ashland, MA (US)

(73) Assignee: Juniper Networks, Inc., Sunnyvale, CA (US)

(*) Notice: Subject to any disclaimer, the term of this patent is extended or adjusted under 35 U.S.C. 154(b) by 167 days.

(21) Appl. No.: 13/099,611

(22) Filed: May 3, 2011

(51) Int. Cl.
*H04L 12/26* (2006.01)
*H04L 12/56* (2006.01)
*H04J 3/24* (2006.01)

(52) U.S. Cl.
USPC .......................................................... 370/235

(58) Field of Classification Search
USPC ................. 709/245, 226; 370/235, 392, 409, 370/469
See application file for complete search history.

(56) References Cited

U.S. PATENT DOCUMENTS

| | | | | |
|---|---|---|---|---|
| 6,021,134 A * | 2/2000 | Hiraiwa et al. | ............... | 370/474 |
| 6,570,875 B1 * | 5/2003 | Hegde | ............... | 370/389 |
| 6,876,654 B1 * | 4/2005 | Hegde | ............... | 370/392 |
| 8,064,465 B2 * | 11/2011 | Deguchi et al. | ............... | 370/395.6 |
| 2003/0103507 A1 * | 6/2003 | Lynch et al. | ............... | 370/392 |
| 2004/0196840 A1 * | 10/2004 | Amrutur et al. | ............... | 370/389 |
| 2005/0238049 A1 * | 10/2005 | Delregno | ............... | 370/466 |
| 2006/0143300 A1 * | 6/2006 | See et al. | ............... | 709/227 |
| 2007/0201469 A1 * | 8/2007 | Iyer et al. | ............... | 370/391 |
| 2007/0253438 A1 * | 11/2007 | Curry et al. | ............... | 370/412 |
| 2009/0141717 A1 * | 6/2009 | Cabeca et al. | ............... | 370/389 |
| 2009/0205024 A1 * | 8/2009 | Kokot et al. | ............... | 726/5 |
| 2011/0032843 A1 * | 2/2011 | Papp et al. | ............... | 370/254 |
| 2011/0096670 A1 * | 4/2011 | Cheng et al. | ............... | 370/241.1 |

OTHER PUBLICATIONS

Sheldon, Tom. "L2TP (Layer 2 Tunneling Protocol)", http://www.linktionary.com/l/l2tp.html, printed May 3, 2011, (3 pages).

* cited by examiner

*Primary Examiner* — Alpus H Hsu
*Assistant Examiner* — Walter Divito
(74) *Attorney, Agent, or Firm* — Harrity & Harrity, LLP

(57) ABSTRACT

A device may determine, based on layer 2 protocol information of incoming traffic, whether to forward the traffic as layer 2 traffic or terminate the traffic as layer 3 traffic. The device may receive the incoming traffic as packets of a virtual local area network (VLAN) and may analyze a protocol type included in layer 2 header information of the packets to classify, based on the protocol type, the packets as layer 2 output traffic or layer 3 output traffic. The device may transmit, as layer 2 traffic of the VLAN, those of the packets that are classified as layer 2 output traffic, and may terminate, to layer 3 traffic, those of the packets that are classified as layer 3 output traffic.

21 Claims, 6 Drawing Sheets

MIXED MODE L2 CROSS CONNECT AND L3 TERMINATION AT AN EDGE NETWORK DEVICE

BACKGROUND

Communication networks typically include devices, such as firewalls, routers, switches or gateways, which transfer or switch data, such as packets, from one or more sources to one or more destinations. One type of router, known as an edge router, may be placed at the edge of networks to provide an interface between different network domains. Edge routers may include provider edge routers, which may be routers placed at the edge of a service provider's network (e.g., at the edge of an Internet Service Provider (ISP) network), and subscriber edge routers, which may be placed at the edge of a subscriber (e.g., customer) network. In contrast to edge routers, core routers may operate within a network to carry traffic between edge routers.

A service provider that operates a network may transmit subscriber traffic through the network using a number of different possible technologies. In one possible technique, edge routers may forward traffic over the service provider's network as layer 2 traffic in the Open Systems Interconnection (OSI) model, such as by cross-connecting VLANs (virtual local area networks). For example, a subscriber may operate two remote corporate offices, both associated with a single VLAN, that are cross connected using a layer 2 MPLS (multi-protocol label switching) pseudo-wire. Another possible technique to connect subscriber traffic over the service provider's network is to terminate incoming traffic at an edge router and route the traffic using layer 3 routing.

In one existing technique for using both layer 2 forwarding and layer 3 routing, a subscriber may maintain multiple VLANs. One of the VLANs may be dedicated to layer 2 switching and the other to layer 3 routing. However, such an arrangement may not provide a flexible solution that allows subscribers and/or service providers to forward traffic over a network.

SUMMARY

One implementation is directed to a device that may include: ports to receive incoming layer 2 traffic from subscribers, where at least some of the incoming traffic is associated with one or more VLANs; and a filter. The filter may extract layer 2 header information from the incoming traffic; may classify, based on the layer 2 header information, the incoming traffic as layer 2 output traffic or layer 3 output traffic; may transmit, from the device, the incoming traffic as layer 2 traffic when the incoming traffic is classified as layer 2 output traffic; and may terminate, at the device, the incoming traffic as layer 3 traffic, and transmit the layer 3 traffic from the device, when the incoming traffic is classified as layer 3 output traffic.

In another implementation, a method may include: receiving, by a network device, packets in a VLAN; analyzing a protocol type included in layer 2 header information of the packets of the VLAN to classify, based on the protocol type, the packets as layer 2 output traffic or layer 3 output traffic; transmitting, as layer 2 traffic of the VLAN, those of the packets that are classified as layer 2 output traffic; terminating to layer 3 traffic, those of the packets that are classified as layer 3 output traffic; and transmitting the terminated packets as layer 3 traffic.

In another implementation, a network device may include a processor and a memory to store instructions for execution by the processor. The instructions may include instructions to: receive configuration information specifying a filter to classify layer 2 packets, received by the network device, as layer 2 output traffic or layer 3 output traffic, the classification being based on a protocol type of the received layer 2 packets; and to cause the filter to be implemented by the network device. The network device may further include ports to: transmit, as layer 2 traffic, those of the received layer 2 packets that are classified as layer 2 output traffic; and transmit, as layer 3 traffic, those of the received layer 2 packets that are classified as layer 3 output traffic.

BRIEF DESCRIPTION OF THE DRAWINGS

The accompanying drawings, which are incorporated in and constitute a part of this specification, illustrate one or more implementations described here and, together with the description, explain these implementations. In the drawings.

DETAILED DESCRIPTION

The following detailed description of the invention refers to the accompanying drawings. The same reference numbers in different drawings may identify the same or similar elements.

As described herein, an edge router, such as an edge router administered by a service provider, may handle subscriber traffic differently based on the traffic's protocol. A layer 2 filter may be used to determine the protocol type of the traffic, based on, for example, layer 2 header values. The edge router may cross connect (i.e., layer 2 VLAN cross connect) subscriber traffic that corresponds to a first set of protocols and perform layer 3 termination of subscriber traffic that corresponds to a second set of protocols. The traffic incoming to the edge router may all belong to the same VLAN.

Network operations discussed herein will be described as applying to packets. Units of data other than packets, such as frames, cells, or other fixed or variable length data units may alternatively be used.

Layer 2 traffic, as used herein, refers to network traffic at the data link layer in the OSI reference model. The term "layer 2" may be abbreviated "L2." Similarly, layer 3 traffic, as used herein, refers to network traffic at the network layer of the OSI reference model. The term "layer 3" may be abbreviated "L3."

Figure 1:
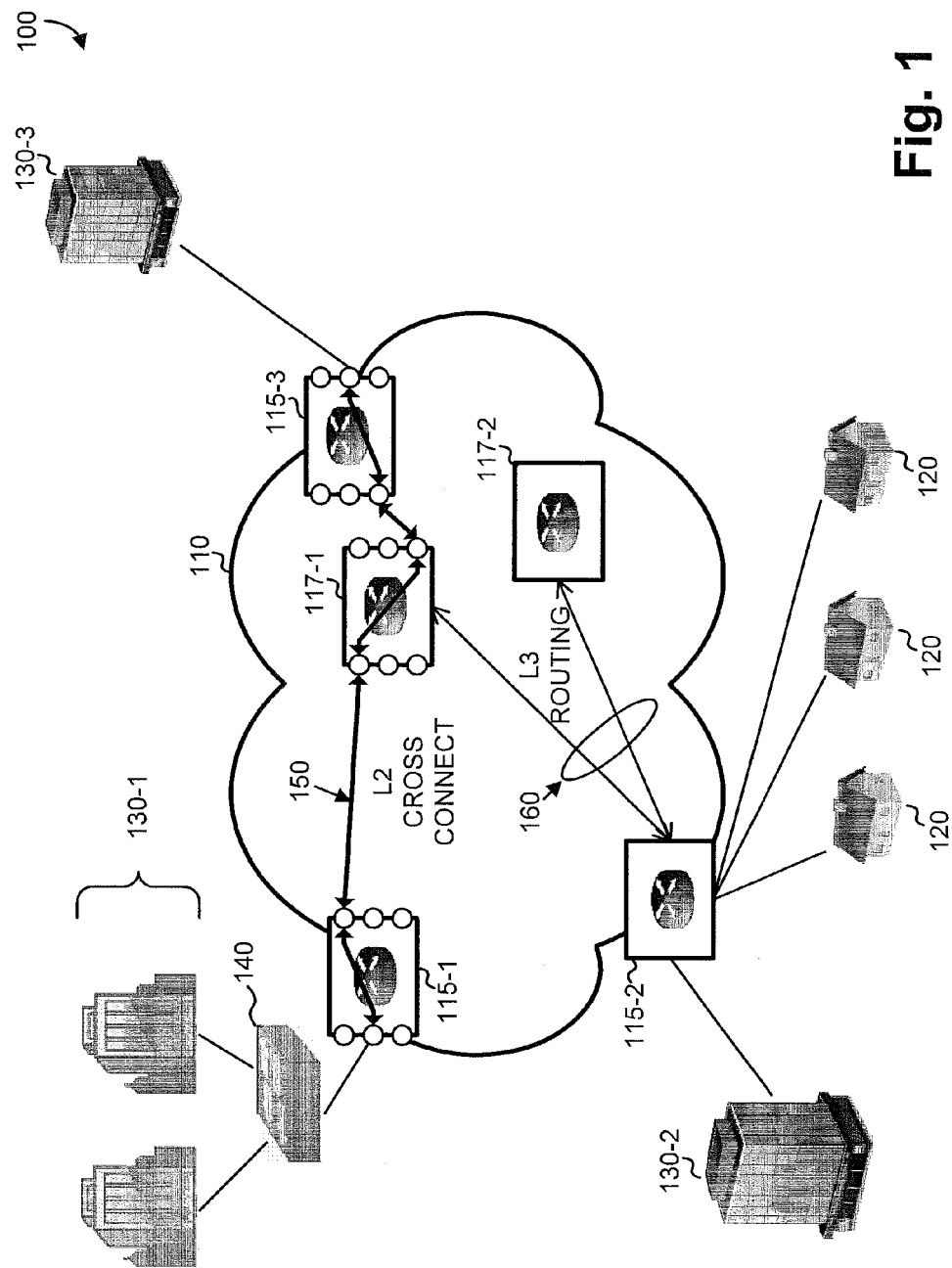
FIG. 1 is a diagram of an example system in which concepts described herein may be implemented.

FIG. 1 is a diagram of an example system 100 in which concepts described herein may be implemented. System 100 may include a network 110 that is to provide network connectivity to one or more subscribers (e.g., customers of the operator of network 110). The subscribers shown in FIG. 1 may include residential subscribers 120 and non-residential subscribers 130-1 through 130-3 (referred to herein collectively as "non-residential subscribers 130" or generically as "non-residential subscriber 130"). In one implementation, each non-residential subscriber 130 may correspond to a proprietary local area network operated by a company or other organization. Some of non-residential subscribers 130, such as non-residential subscriber 130-1, may use an aggregation switch 140 to connect to network 110.

Network 110 may generally include one or more types of packet-switched networks. For instance, network 110 may include a cellular network, a satellite network, the Internet, or a combination of these (or other) networks that are used to transport data. Although shown as a single element in FIG. 1, network 110 may include a number of separate networks that function to provide traffic to subscribers 120 and 130. Network 110 may be implemented using a number of network devices that include, for example, routers, switches, gateways, and/or other devices that are used to implement network 110. As illustrated, the network devices may include edge routers 115-1 through 115-3 (referred to herein collectively as "edge routers 115" or generically as "edge router 115") and core routers 117-1 and 117-2 (referred to herein collectively as "core routers 117" or generically as "core router 117").

Edge routers 115 may include subscriber edge routers or provider edge routers that provide routing and switching services for network 110. In an alternative possible implementation, edge routers may perform other networking functions, such as acting as an aggregation switch. Residential subscribers 120 and non-residential subscribers 130 may connect, either directly or indirectly, to edge routers 115 to obtain access to network 110. Edge routers 115 may implement a number of protocols, such as a border gateway protocol, to access other networks or subscribers. Edge routers 115 may support VLANs that can be used to manage the connectivity of residential subscribers 120 and non-residential subscribers 130. A VLAN may represent a group of devices that can communicate as if they were attached to the same broadcast domain (e.g., the same local area network) regardless of the physical location of the devices. An ISP may, for example, wish to assign each residential subscriber 120 to a separate VLAN. As another example, non-residential subscribers 130-1 through 130-3 may each be assigned to separate VLANs or, in situations in which multiple ones of non-residential subscribers 130 are associated with the same entity (e.g., geographically remote corporate offices), a number of non-residential subscribers 130 may belong to a single VLAN.

Core routers 117 may provide routing services within an autonomous system to carry traffic between edge routers 115. Core routers 117 may include high capacity "back bone" routers within network 110.

Residential subscribers 120 may include customers/subscribers to an ISP that provides access to network 110. Residential subscribers 120 may connect to edge routers 115, either directly or indirectly, to obtain network access, such as home broadband access (e.g., broadband access to the Internet). In one implementation, an ISP providing service to residential subscribers 120 may use VLANs to control network access. For example, the ISP may assign each residential subscriber to a separate VLAN.

Non-residential subscribers 130 may include businesses, charitable organizations, or other entities. Each of non-residential subscribers 130 may include, for example, a private LAN for that local corporate premises. Network 110 may be used to connect non-residential subscribers 130 to one another and to other networks, such as the Internet. In one implementation, multiple non-residential subscribers 130, such as non-residential subscribers 130-1 and 130-2, may connect to one another as a single VLAN connected via network 110.

Aggregation switch 140 may provide switching, such as layer 2 switching, to aggregate multiple connections and provide the aggregated connection to an edge router, such as edge router 115-1. In some implementations, aggregation switch 140 may represent a number of switches that provide link aggregation, such as aggregation for a metropolitan area network.

Traffic received at edge routers 115 may be forwarded through network 110 using different possible networking techniques. One such technique is VLAN cross connect. A VLAN cross connection may be a layer 2 (e.g., Ethernet based) technique that may be particularly suited to businesses (e.g., non-residential subscribers 130) and residential customers (e.g., residential subscribers 120) that desire a service level agreement (SLA) with guaranteed bandwidth, jitter, and/or delay. VLAN cross-connect may generally provide an improvement to Ethernet bridging that can scale to accommodate a large number of media access control (MAC) addresses.

In operation, a VLAN may be cross connected, over network 110, using, for instance, a virtual private LAN service (VPLS) implemented using pseudo-wires, such as, for example, an MPLS (multiprotocol label switching) pseudo-wire. A pseudo-wire is a technique to emulate a layer 2 point-to-point connection-oriented service over a packet-switched network. For example, a VLAN cross connect "tag" may be included in the header of packets that ingress to edge routers 115. The tag, along with the ingress port of the packet, may be used to determine, at edge routers 115 and core routers 117, the correct output port for the packet.

An example of a layer 2 VLAN cross connection is shown in FIG. 1 as path 150. Path 150 may be a pseudo-wire through network 110. Assume that the circles illustrated on each of edge routers 115 and core routers 117 correspond to ports for these routers, called the "top," "middle," and "lower" ports herein. A packet incoming to the middle left port on edge router 115-1 may be determined, based on the incoming port and the VLAN tag, to egress at the upper right port, which may lead to the upper left port of core router 117-1. As shown, path 150 may similarly include an egress at the lower right port of core router 117-1, an ingress at the lower left port of edge router 115-3, and an egress at the middle right port of edge router 115-3, to non-residential subscriber 130-3. In this manner, packets may be cross-connected across network 110 in the layer 2 domain.

In some situations, instead of forwarding traffic over network 110 using layer 2 techniques, the service provider and/or customer may wish to terminate layer 2 traffic at edge routers 115 and forward the traffic through network 110 as layer 3 routed traffic. Routing may be performed by edge routers 115 and core routers 117 on the basis of routing tables maintained by routers 115/117 through a routing protocol such as a border gateway protocol (BGP). Layer 3 routing is particularly illustrated in FIG. 1 as L3 routing 160.

In FIG. 1, traffic is illustrated as being forwarded via a layer 2 cross connection by edge router 115-1 and terminated to a layer 3 connection by edge router 115-2. In practice, a single edge router 115 may perform both layer 2 cross connection and layer 3 termination. In existing systems, all traffic within a single subscriber VLAN may either be terminated to a layer 3 connection or cross connected over a layer 2 connection.

Although FIG. 1 shows example components of system 100, in other implementations, system 100 may contain fewer components, different components, differently arranged components, and/or additional components than those depicted in FIG. 1. Alternatively, or additionally, one or more components of system 100 may perform one or more other tasks described as being performed by one or more other components of system 100.

Figure 2:
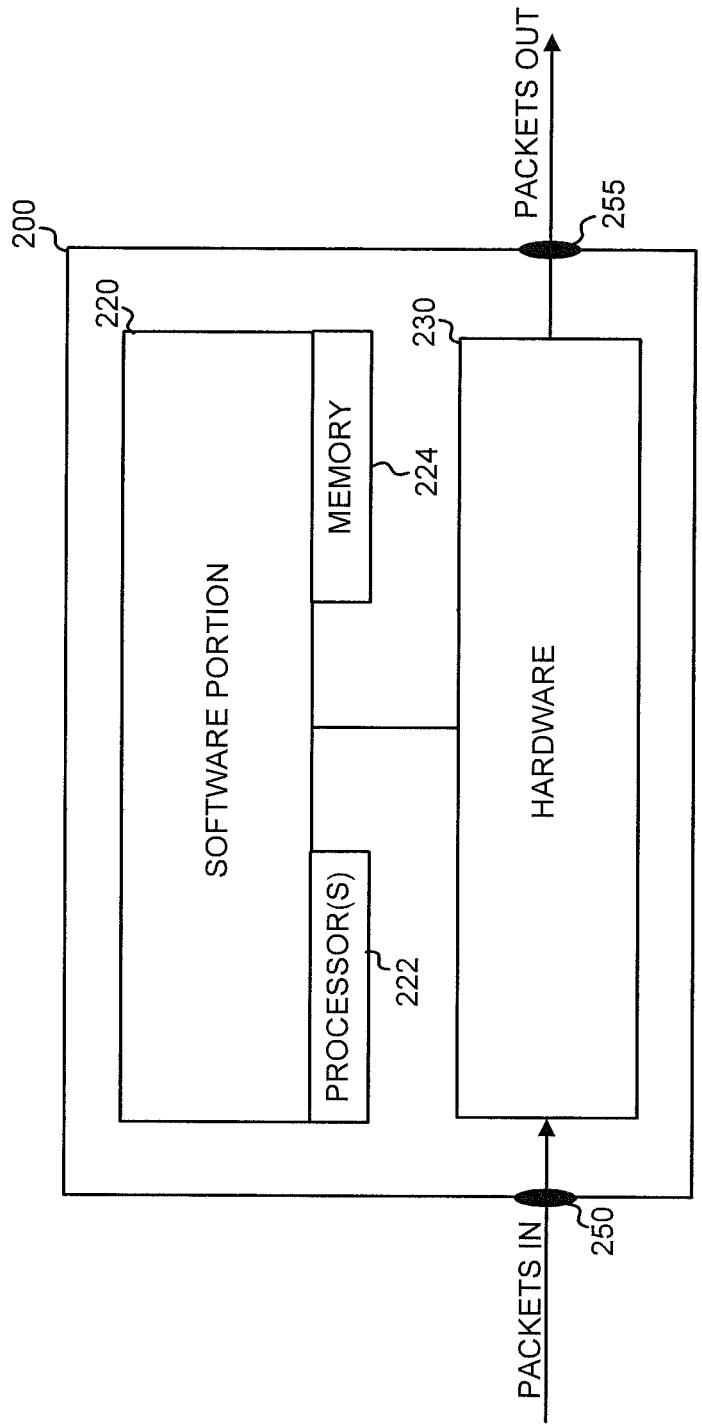
FIG. 2 is a block diagram of an example network device.

FIG. 2 is a block diagram of an example network device 200, which may correspond to one of edge routers 115 or core routers 117. In order to increase throughput, network device 200 may use dedicated hardware to assist in processing incoming packets. As shown in FIG. 2, network device 200 may generally include a software portion 220 and a hardware portion 230.

Software portion 220 may include software designed to control network device 200. In general, software portion 220 may implement the functions of network device 200 that are not time critical. The functions described as being performed by software portion 220, may be implemented through, for example, one or more general purpose processors 222 and one or more computer memories 224. Processors 222 may include processors, microprocessors, or other types of processing logic that may interpret and execute instructions. Computer memories 224 (also referred to as computer-readable media herein) may include random access memories (RAMs), read-only memories (ROMs), and/or other types of dynamic or static storage devices that may store information and instructions for execution by one or more processors 222. In general, software portion 200 may perform certain functions in response to processor(s) 222 executing software instructions contained in a non-transitory computer-readable medium, such as memory 224.

Hardware portion 230 may include circuitry for efficiently processing packets received by network device 200. Hardware portion 230 may include, for example, logic, such as an application specific integrated circuit (ASIC), a field programmable gate array (FPGA), and/or a content-addressable memory (CAM). When network device 200 is a router and/or switch, hardware portion 230 may receive incoming packets, extract header information for the packets, and process the packets based on the extracted header information.

Network device 200 may additionally include one or more input ports 250 for receiving incoming packets and one or more output ports 255 for transmitting outgoing packets. In some implementations, a port may act as both or one of an input port 250 or an output port 255.

Although network device 200 is shown as including a software portion 220 and a hardware portion 230, network device 200 may, in some implementations, be implemented entirely through hardware. Additionally, network device 200 may include additional, fewer, different, or differently arranged components than those illustrated in FIG. 2.

Consistent with aspects described herein, traffic within a single VLAN may be both layer 2 cross connected or terminated to layer 3 traffic. The decision as to whether cross connect or terminate the traffic may be made on a per-packet basis based on layer 2 header values.

Figure 3:
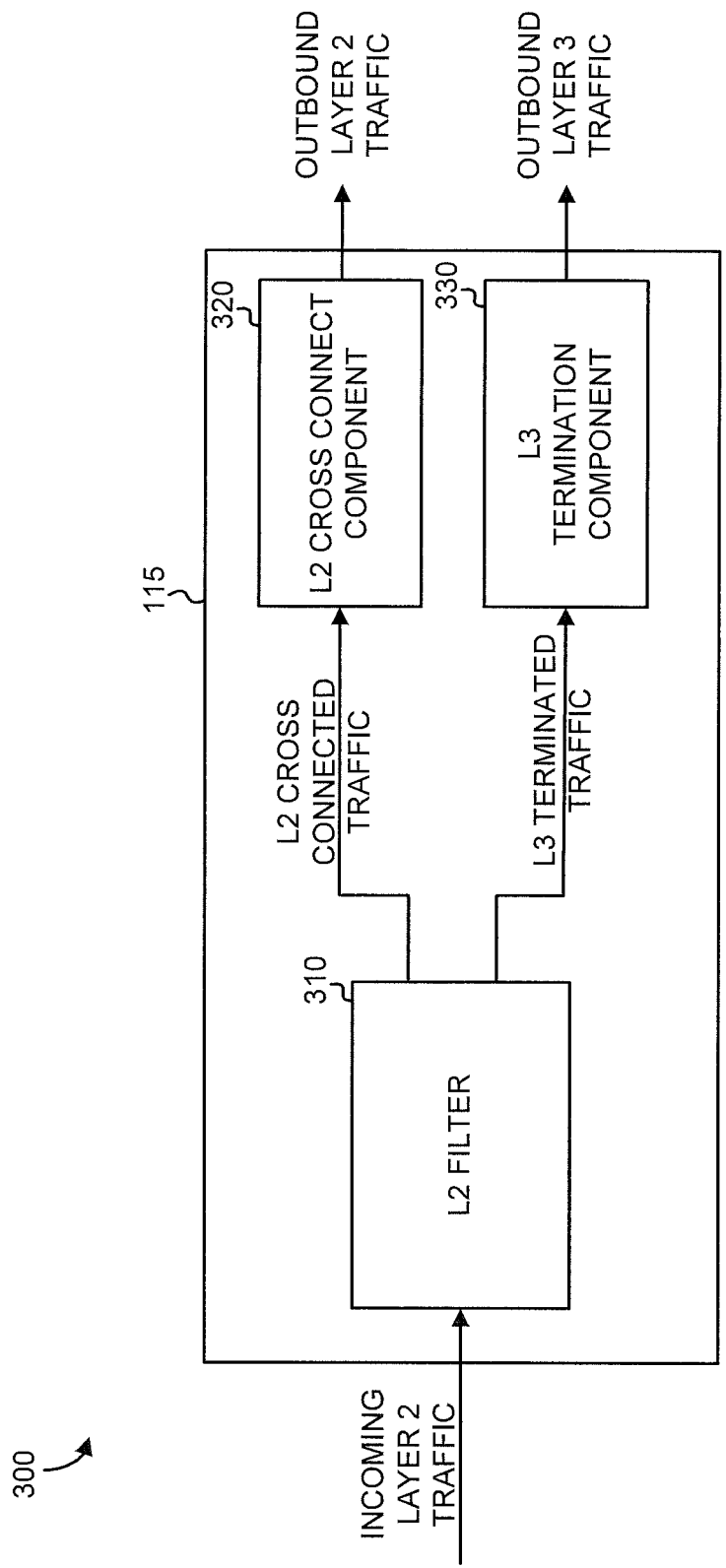
FIG. 3 is a diagram illustrating conceptual components of an edge router.

FIG. 3 is a diagram illustrating conceptual components 300 of edge routers 115 and/or aggregation switch 140. Components 300 may be implemented in hardware portion 230 and/or software portion 220 of network device 200. Components 300 may include L2 filter 310, L2 cross connect component 320, and L3 termination component 330.

L2 filter 310 may receive incoming layer 2 traffic. L2 filter 310 may determine whether the traffic should be cross connected through network 110 or terminated to layer 3 traffic. In one implementation, L2 filter 310 may analyze the layer 2 header fields of each incoming packet and may classify each packet as a layer 2 output packet or a layer 3 output packet based on the analysis. In FIG. 3, traffic that L2 filter 310 classifies as traffic to be cross connected as layer 2 traffic may be output to L2 cross connect component 320. Traffic that L2 filter 310 classifies as traffic to be terminated and routed as layer 3 traffic may be output to L3 termination component 330.

In one implementation, L2 filter 310, L2 cross connection component 310, and/or L3 termination component 330 may be provided in hardware portion 230 of network device 200, and be implemented using, for example, an ASIC, a FPGA, and/or a CAM.

Figure 4:
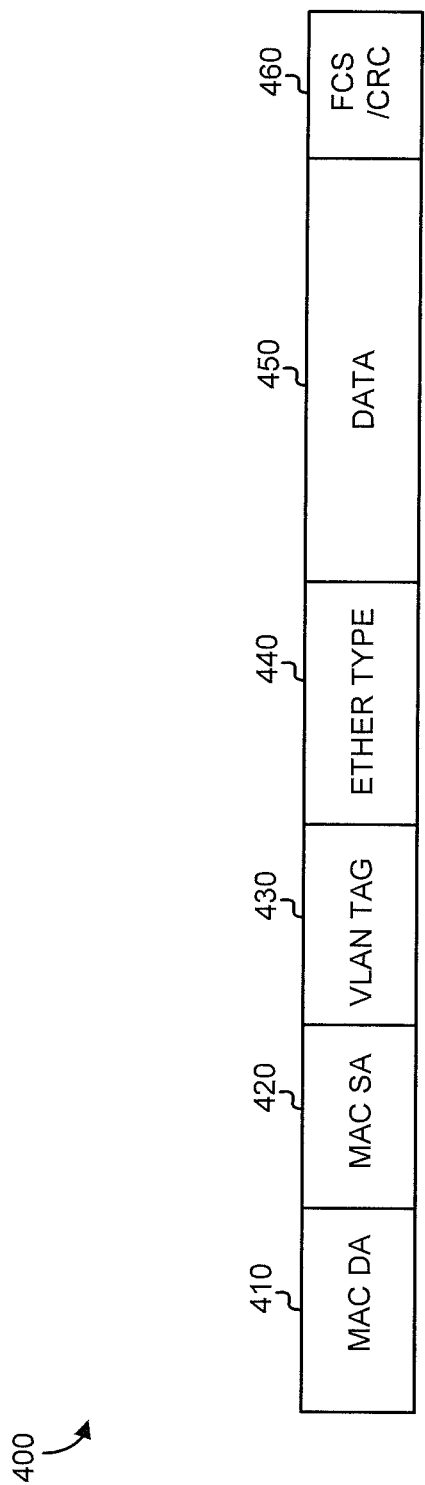
FIG. 4 is a diagram illustrating an example of a packet.

FIG. 4 is a diagram illustrating an example of an Ethernet (layer 2) packet 400. Packet 400 may include a MAC destination address (MAC DA) field 410, a MAC source address (MAC SA) field 420, a VLAN tag field 430, an ether type field 440, a payload (DATA) field 450, and frame check sequence (FCS)/cyclic redundancy check (CRC) field 460. MAC destination address field 410, MAC source address field 420, VLAN tag field 430, and ether type field 440 may define the header information for packet 400.

MAC destination address field 410 may store the MAC address corresponding to the intended destination of packet 400. Similarly, MAC source address field 420 may store the MAC address corresponding to the network device that originated packet 400. A MAC address may be a hardware address that uniquely identifies a network device.

VLAN tag field 430 may include a tag, such as a 12-bit value, that is used to uniquely identify a VLAN. In some situations, VLAN tag field 430 may include a number of "stacked" VLAN tags, through which switches/routers may encapsulate packets that are transmitted over various portions of network 110. VLAN tag field 430 may be an optional field that may be inserted by network devices that are originating L2 bridging or L2 cross connections.

Ether type field 440 may be a field that indicates which protocol is encapsulated in data field 450. Ether type field 440 may be a 16-bit field that may be used to denote a number of different protocols. For example, different pre-defined values of ether type field 440 may be used to indicate point-to-protocol (PPP), Internet Protocol version 4 (IPv4), Internet Protocol version 6 (IPv6), MPLS unicast, MPLS multicast, etc.

Data field 450 may include the payload for packet 400. In other words, data field 450 may include the substantive data of packet 400. FCS/CRC field 460 may provide error checking data for packet 400. FCS/CRC field 460 may be set based on the values of the other fields of packet 400.

The fields shown in FIG. 4 illustrate example fields for a packet. In other possible implementations, additional, fewer, or different fields may be used.

Referring back to FIG. 3, in one implementation, L2 filter 310 may determine whether an incoming layer 2 packet, such as packet 400, is to be layer 2 cross connected or terminated to a layer 3 packet based on ether type field 440 of packet 400. For example, L2 filter 310 may be configured to classify all incoming PPP traffic as cross connected traffic. Accordingly, an incoming packet 400, which has a VLAN tag and an ether type value that indicates PPP traffic (e.g., hexadecimal 0x8864), may be forwarded over network 110 as layer 2 cross connected traffic. In some implementations, the ether type values that are used to classify traffic as traffic that is to be cross connected may be configurable by an administrator. In other implementations, information other than protocol type may be used to determine whether an incoming packet is to be layer 2 cross connected or terminated to a layer 3 packet. For example, MAC source address field 410 or MAC destination address field 420 may be used in conjunction with ether type field 440 to make the determination.

L2 cross connect component 320 may operate to forward traffic that is determined to be traffic that is to be cross connected. L2 cross connect component 320 may, for example, use the VLAN tag 430 of packet 400 to lookup the egress port for packet 400. L2 cross connect component 320 may then forward packet 400 to that port.

L3 termination component 330 may operate to terminate the traffic that is not determined by L2 filter 310 to be layer 2 cross connect traffic. Terminating the layer 2 traffic may include converting packet 400 into a layer 3 packet, such as by removing the layer 2 header information and inserting a layer 3 packet header. The layer 3 packet may then be routed through network 110 using conventional layer 3 routing techniques.

In one example implementation of the operation of components 300 at an edge router 115, incoming layer 2 traffic that is PPP traffic may be separated and then layer 2 cross connected to implement a virtual private LAN service (VPLS). IPv4 and IPv6 traffic, however, may be terminated locally at edge router 115 and then routed as layer 3 traffic.

Although FIG. 3 shows example components 300, in other implementations, components 300 may contain fewer components, different components, differently arranged components, and/or additional components than those depicted in FIG. 3. Alternatively, or additionally, one or more components of components 300 may perform one or more other tasks described as being performed by one or more other components of components 300.

Figure 5:
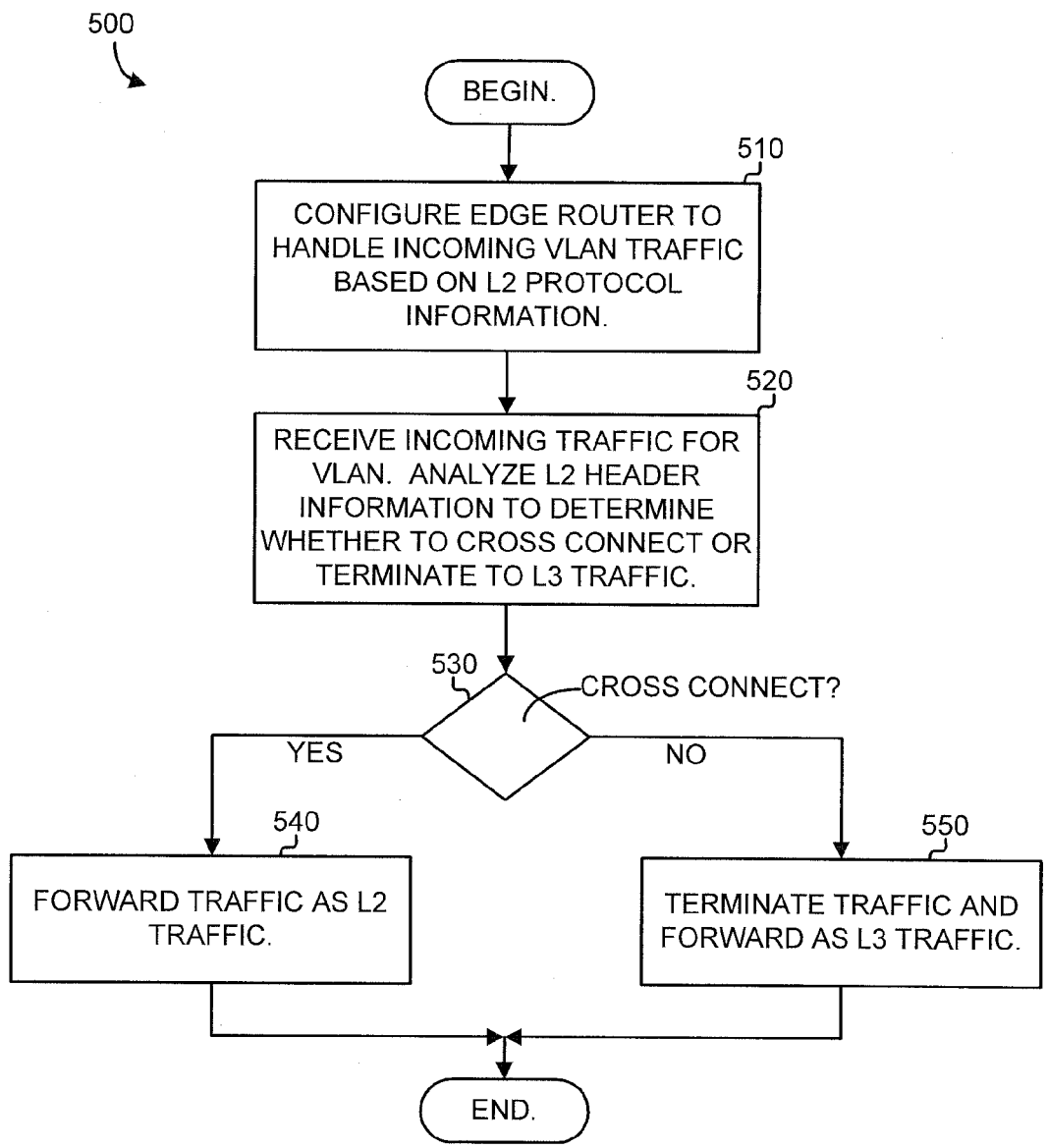
FIG. 5 is a flow chart illustrating an example process for cross connecting or terminating VLAN traffic.

FIG. 5 is a flow chart illustrating an example process 500 for cross connecting or terminating VLAN traffic. Process 500 may be performed by, for example, an edge router 115.

A user, such as an administrator, may configure one or more of edge routers 115 to handle, by either terminating or layer 2 forwarding, incoming VLAN traffic based on layer 2 protocol information for the traffic (block 510). The administrator may configure L2 filter 310. L2 filter 310 may be configured to extract, for example, protocol information from ether type field 440. Based on the protocol information, traffic may either be cross connected or terminated as L3 traffic. Other information, such as MAC destination address 410 or MAC source address 420 may also be taken into account by L2 filter 310. L2 filter 310 may be configured by the administrator using a command line or graphical interface. In one implementation, the administrator may remotely login to a router 115 to configure L2 filter 310. For example, the administrator may login to router 115, upload configuration information defining L2 filter 310, and direct that the configuration information be programmed and/or stored by router 115 to thus implement L2 filter 310.

L2 filter 310 may be configured on a per-VLAN or per-subscriber basis. Thus, for instance, each VLAN may be potentially associated with a different L2 filter 310. Alternatively, multiple subscribers or VLANs may be associated with a single L2 filter 310.

In some implementations, an edge router 115 may be automatically configured to handle VLAN traffic, such as by a Radius or other policy server. The policy server may detect the VLAN, and based on pre-configured policy information, determine how to handle traffic in the VLAN. For example, in some situations, the VLAN may be fully cross-connected as a VPLS, fully terminated as L3 traffic, or handled as "mixed mode" traffic, as described herein, using L2 filter 310.

Process 500 may further include, during operation of edge router 115, receiving the incoming traffic for a VLAN (block 520). Based on the L2 filter 310 for the VLAN, the L2 header information may be analyzed to determine whether to cross connect the traffic or terminate the traffic to L3 traffic (block 520). As mentioned above, in one implementation, ether type field 440 of a packet 400 may be parsed to determine the protocol type of the packet. Packets associated with certain protocols, such as PPP, may be cross connected. Packets associated with other protocols (e.g., any protocol that is not PPP), may be terminated at edge router 115 to L3 traffic.

When the result of block 520 is to cross connect an incoming packet (block 530—YES), process 500 may further include forwarding the traffic as layer 2 traffic (block 540). The forwarded traffic may be cross connected using, for example, a MPLS pseudo-wire (as illustrated in path 150 in FIG. 1). Other layer 2 techniques for forwarding the traffic over network 110 may alternatively be used. For example, Ethernet bridging may be used.

When the result of block 520 is not to cross connect an incoming packet (block 530—NO), process 500 may further include terminating the traffic at edge router 115 (block 550). The terminated traffic may be converted to layer 3 packet traffic and forwarded into network 110.

Figure 6:
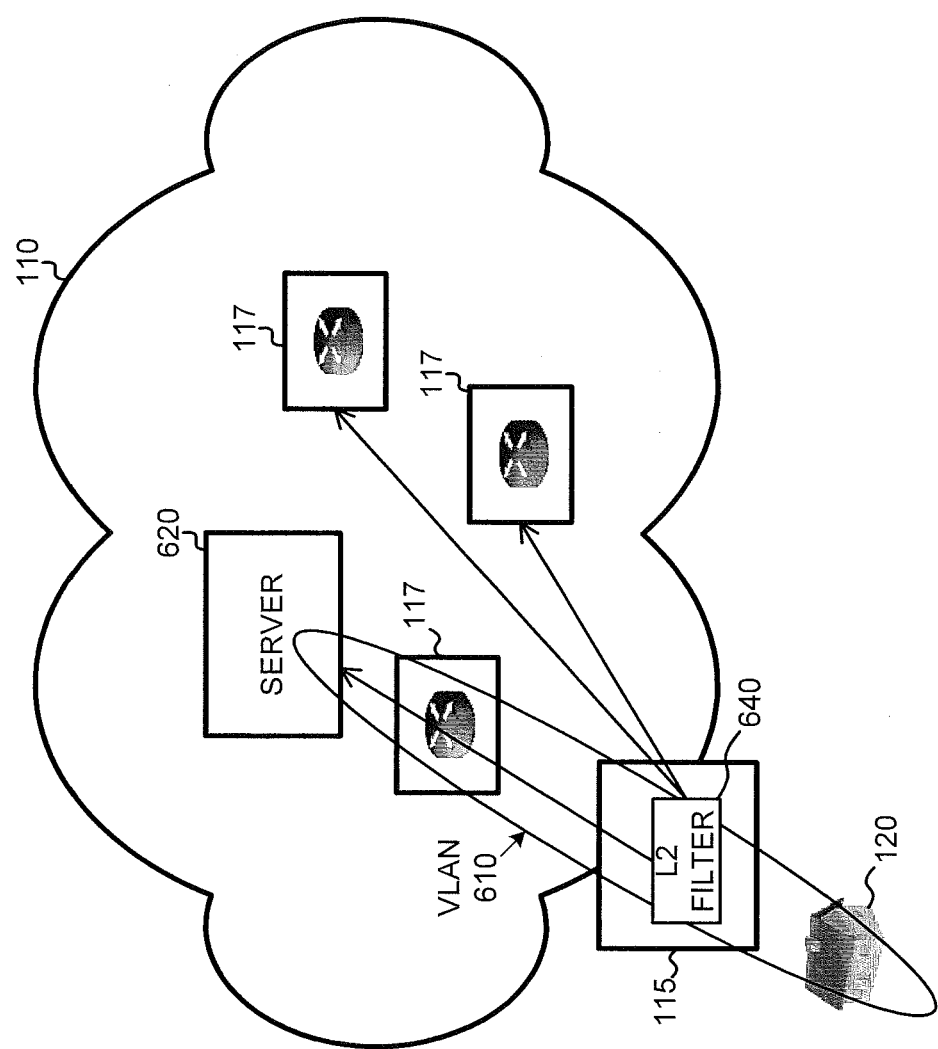
FIG. 6 is a diagram to illustrate an example application of the techniques described herein.

FIG. 6 is a diagram that will be used to illustrate an example application of the techniques described above.

As shown in FIG. 6, a residential subscriber 120 may connect to network 110 to obtain broadband access. The subscriber's ISP may wish to assign subscriber 120 to a VLAN 610. A server 620 in network 610 may be established by the ISP to provide certain services, such as video on demand services, to subscriber 120. The ISP may wish to handle the video on demand traffic to server 620 as layer 2 traffic while other traffic may be terminated at edge router 115 and forwarded through network 110 as layer 3 traffic.

L2 filter 640 may be configured at edge router 115 and may represent L2 filter 310, L2 cross connect component 320, and L3 termination component 330 (from FIG. 3). Assume that the video on demand traffic is transmitted as PPP traffic. L2 filter 640 may be configured to forward packets, as layer 2 packets, when ether type field 440 indicates the PPP protocol. Other packets may be terminated, at edge router 115, and routed as layer 3 traffic. Advantageously, a single router 115, at the aggregate edge of network 110, can provide traffic cross connection and traffic termination for a single VLAN. The ISP and/or service provider may be able to flexibly configure "mixed mode" traffic handling as desired. Additionally, by performing multiple functions within a single network device, equipment costs can be reduced.

The foregoing description of implementations provides illustration and description, but is not intended to be exhaustive or to limit the invention to the precise form disclosed. Modifications and variations are possible in light of the above teachings or may be acquired from practice of the invention.

For example, while a series of acts has been described with regard to FIG. 5, the order of the acts may be varied in other implementations consistent with the invention. Moreover, non-dependent acts may be implemented in parallel.

It will also be apparent that aspects described herein may be implemented in many different forms of software, firmware, and hardware in the implementations illustrated in the figures. The actual software code or specialized control hardware used to implement aspects described herein is not intended to limit the scope of the invention. Thus, the operation and behavior of the aspects were described without reference to the specific software code—it being understood that software and control hardware can be designed to implement the aspects based on the description herein.

Further, certain aspects described herein may be implemented as "logic" or as a "component" that performs one or more functions. This logic or component may include hardware, such as an application specific integrated circuit or a field programmable gate array, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
   one or more ports to:
      receive incoming layer 2 traffic from subscribers,
         at least some of the incoming traffic being associated with one or more virtual local area networks (VLANs);
   a filter to:
      extract layer 2 header information from the incoming traffic,
      classify, based on the extracted layer 2 header information, the incoming traffic as layer 2 output traffic or layer 3 output traffic, and
      determine that the incoming traffic is to be cross connected through a network associated with the device when the incoming traffic is classified as the layer 2 output traffic;
   a cross connect component to:
      transmit, from the device, the incoming traffic as layer 2 traffic when the filter determines that the incoming traffic is to be cross connected through the network; and
   a termination component to:
      convert the incoming traffic into a layer 3 packet when the incoming traffic is classified as the layer 3 output traffic,
         when converting the incoming traffic into the layer 3 packet, the termination component is to:
            insert a layer 3 packet header, and
      transmit, after converting the incoming traffic into the layer 3 packet, the layer 3 packet when the incoming traffic is classified as the layer 3 output traffic.

2. The device of claim 1, where, when classifying the incoming traffic, the filter is to:
   classify the incoming traffic based on information identifying a protocol type in the layer 2 header information.

3. The device of claim 2,
   where the layer 2 header information includes an ether type field, and
   where the ether type field includes the information identifying the protocol type.

4. The device of claim 1, where, when classifying the incoming traffic, the filter is to:
   classify the incoming traffic based on information identifying one or more source or destination media access control (MAC) addresses in the layer 2 header information.

5. The device of claim 1, where, when classifying the incoming traffic, the filter is to:
   classify packets in the incoming traffic based on a particular VLAN, of the one or more VLANs, associated with the packets.

6. The device of claim 1, where the filter is implemented via one or more of an application specific integrated circuit (ASIC), a field programmable gate array (FPGA), or a content-addressable memory (CAM).

7. The device of claim 1, where, when classifying the incoming traffic, the filter is to:
   classify, based on the layer 2 header information, packets in the incoming traffic as the layer 2 output traffic when a protocol associated with the packets is a point-to-point (PPP) protocol.

8. The device of claim 1, where, when classifying the incoming traffic, the filter is to:
   classify packets in the incoming traffic as the layer 3 output traffic when a protocol associated with the packets is Internet Protocol version 4 (IPv4) or Internet Protocol version 6 (IPv6).

9. The device of claim 1, where, when transmitting the incoming traffic as the layer 2 traffic, the cross connect component is to:
   transmit the incoming traffic as VLAN cross connect traffic.

10. The device of claim 1, where the device includes a subscriber edge router, a provider edge router, or an aggregation switch.

11. A method comprising:
    receiving, by a network device, packets of a virtual local area network (VLAN);
    analyzing, by the network device, information identifying a protocol type included in layer 2 header information of the packets of the VLAN;
    classifying, by the network device and based on the protocol type, the packets as layer 2 output traffic or layer 3 output traffic;
    determining, by the network device, that the packets are to be cross connected through a network associated with the network device when the packets are classified as the layer 2 output traffic;
    transmitting, from the network device, the packets as layer 2 traffic of the VLAN when the network device determines that the packets are to be cross connected through the network;
    converting, by the network device, the packets into one or more layer 3 packets when the packets are classified as the layer 3 output traffic,
       converting the packets into the one or more layer 3 packets including inserting a layer 3 packet header; and
    transmitting, by the network device and after converting the packets into the one or more layer 3 packets, the one or more layer 3 packets when the packets are classified as the layer 3 output traffic.

12. The method of claim 11, where transmitting the packets as the layer 2 traffic includes:
    transmitting the packets via the VLAN.

13. The method of claim 11, further comprising:
    receiving, from an administrator, configuration information that specifies parameters for analyzing the protocol type; and
    storing the configuration information.

14. The method of claim 11, where classifying the packets includes:
    classifying the packets based on the protocol type and one or more source or destination media access control (MAC) addresses associated with the packets.

15. The method of claim 11, where classifying the packets includes classifying the packets based on the protocol type and information associated with the VLAN.

16. The method of claim 11, where classifying the packets includes:
classifying the packets as the layer 2 output traffic when the protocol type is a point-to-point (PPP) protocol type; and
classifying the packets as the layer 3 output traffic when the protocol type is an Internet Protocol version 4 (IPv4) or Internet Protocol version 6 (IPv6) protocol type.

17. The method of claim 11, where transmitting the packets as the layer 2 traffic includes:
transmitting the packets as VLAN cross connect traffic.

18. A non-transitory computer-readable medium storing computer-executable instructions, the computer-executable instructions comprising:
one or more instructions that, when executed by at least one processor of a network device, cause the at least one processor to:
receive layer 2 packets,
analyze information identifying a protocol type that is included in header information of the layer 2 packets,
classify the layer 2 packets as layer 2 output traffic or layer 3 output traffic based on the protocol type,
determine that the layer 2 packets are to be cross connected through a network associated with the network device when the layer 2 packets are classified as the layer 2 output traffic,
transmit the layer 2 packets as layer 2 output traffic when the layer 2 packets are to be cross connected through the network,
convert the layer 2 packets into one or more layer 3 packets when the layer 2 packets are classified as the layer 3 output traffic, and
transmit, after converting the layer 2 packets into the one or more layer 3 packets, the one or more layer 3 packets when the layer 2 packets are classified as the layer 3 output traffic.

19. The non-transitory computer-readable medium of claim 18, where the one or more instructions to classify the layer 2 packets comprise:
one or more instructions that, when executed by the at least one processor, cause the at least one processor to:
classify the layer 2 packets based on the protocol type and a virtual local area network (VLAN) associated with the layer 2 packets.

20. The non-transitory computer-readable medium of claim 18, where the one or more instructions to classify the layer 2 packets comprise:
one or more instructions that, when executed by the at least one processor, cause the at least one processor to:
classify the layer 2 packets based on the protocol type and source or destination media access control (MAC) addresses associated with the layer 2 packets.

21. The non-transitory computer-readable medium of claim 18, where the one or more instructions to classify the layer 2 packets comprise:
one or more instructions that, when executed by the at least one processor, cause the at least one processor to:
classify the layer 2 packets as the layer 2 output traffic when the protocol type is a point-to-point (PPP) protocol type; and
classify the layer 2 packets as the layer 3 output traffic when the protocol type is an Internet Protocol version 4 (IPv4) or Internet Protocol version 6 (IPv6) protocol type.

* * * * *